United States Patent
Denk et al.

(10) Patent No.: US 9,380,641 B2
(45) Date of Patent: Jun. 28, 2016

(54) MOBILE STATION AND METHOD FOR PROCESSING SIGNALS OF THE GSM AND TD-SCDMA RADIO STANDARDS

(75) Inventors: Robert Denk, Grafing (DE); Bertram Gunzelmann, Königsbrunn (DE); Xiaofeng Wu, Neubiberg (DE)

(73) Assignee: Intel Deutschland GmbH, Neubiberg (DE)

( * ) Notice: Subject to any disclaimer, the term of this patent is extended or adjusted under 35 U.S.C. 154(b) by 1274 days.

(21) Appl. No.: 10/991,559

(22) Filed: Nov. 18, 2004

(65) Prior Publication Data

US 2005/0164732 A1   Jul. 28, 2005

(30) Foreign Application Priority Data

Nov. 28, 2003 (DE) .................................. 103 55 643

(51) Int. Cl.
    *H04W 88/06* (2009.01)
(52) U.S. Cl.
    CPC ..................................... *H04W 88/06* (2013.01)
(58) Field of Classification Search
    CPC .................................................... H04W 88/06
    USPC ............. 455/552.1, 553.1, 76, 450, 258, 318,
              455/255, 550.1, 557; 370/469, 335, 342,
              370/441, 329, 463, 466, 338; 375/222, 223,
                          375/242, 271, 302, 322, 340, 259
    See application file for complete search history.

(56) References Cited

U.S. PATENT DOCUMENTS

| | | | | |
|---|---|---|---|---|
| 4,713,776 | A * | 12/1987 | Araseki .......................... | 704/229 |
| 6,381,461 | B1 * | 4/2002 | Besson et al. ................. | 455/450 |
| 6,532,370 | B1 * | 3/2003 | Underbrink et al. ....... | 455/552.1 |
| 6,757,334 | B1 * | 6/2004 | Feher ............................ | 375/259 |
| 6,785,556 | B2 * | 8/2004 | Souissi ......................... | 455/557 |
| 6,879,600 | B1 * | 4/2005 | Jones et al. ................... | 370/466 |
| 6,914,913 | B2 * | 7/2005 | Sheynman et al. ........... | 370/469 |
| 6,957,091 | B1 * | 10/2005 | Ptasinski et al. ............. | 455/572 |
| 6,961,329 | B1 * | 11/2005 | Bender et al. ................ | 370/342 |
| 7,035,596 | B2 * | 4/2006 | Sato ................................ | 455/76 |

(Continued)

FOREIGN PATENT DOCUMENTS

| | | |
|---|---|---|
| DE | 37 21 889 A1 | 1/1989 |
| DE | 43 43 335 A1 | 6/1995 |

(Continued)

OTHER PUBLICATIONS

Klupsch "Real Time Image Processing based on Reconfigured Hardware Acceleration" Workshop Heterogeneous Reconfigured Systems on Chip (SoC), Apr. 2002.*

(Continued)

*Primary Examiner* — Junpeng Chen
(74) *Attorney, Agent, or Firm* — Eschweiler & Associates, LLC

(57) ABSTRACT

A mobile station is disclosed for processing differing radio standards such as GSM/GPRS/EDGE and TD-SCDMA. The mobile station includes a channel decoding unit and a coding unit. The signals of both radio standards are processed both with the coding unit and with the channel decoding unit. The coding unit and the channel decoding unit are arranged in the baseband chip of the mobile station. The TD-SCDMA-specific algorithms can be generated by means of a coprocessor that is electrically connected to the baseband chip or integrated in the baseband chip.

12 Claims, 2 Drawing Sheets

(56) References Cited

U.S. PATENT DOCUMENTS

| | | | |
|---|---|---|---|
| 7,092,676 B2* | 8/2006 | Abdelgany et al. | 455/76 |
| 7,146,552 B2* | 12/2006 | Kim et al. | 714/755 |
| 7,164,376 B2* | 1/2007 | Gealow et al. | 341/143 |
| 2003/0067894 A1* | 4/2003 | Schmidt | 370/329 |
| 2003/0072320 A1* | 4/2003 | Seo et al. | 370/441 |
| 2003/0142746 A1* | 7/2003 | Tanaka et al. | 375/240.11 |
| 2004/0042437 A1* | 3/2004 | Sheynman et al. | 370/342 |
| 2004/0109431 A1* | 6/2004 | Abrahamson et al. | 370/342 |
| 2004/0151140 A1* | 8/2004 | Rozenblit et al. | 370/335 |
| 2004/0185899 A1* | 9/2004 | Hayem et al. | 455/552.1 |
| 2005/0025182 A1* | 2/2005 | Nazari | 370/469 |
| 2005/0048940 A1* | 3/2005 | Wu et al. | 455/193.1 |
| 2005/0079889 A1* | 4/2005 | Vaglica et al. | 455/557 |
| 2005/0089061 A1* | 4/2005 | Logvinov et al. | 370/463 |
| 2006/0009187 A1* | 1/2006 | Sheynman et al. | 455/318 |
| 2006/0111141 A1* | 5/2006 | Smith et al. | 455/553.1 |
| 2006/0276154 A1* | 12/2006 | Kaewell, Jr. | 455/258 |

FOREIGN PATENT DOCUMENTS

| | | |
|---|---|---|
| DE | 197 33 860 A1 | 2/1999 |
| EP | 0 665 659 A2 | 8/1995 |
| EP | 1 059 822 A2 | 12/2000 |
| WO | WO 96/14719 T1 | 5/1996 |
| WO | WO 2005043826 A1 * | 5/2005 |

OTHER PUBLICATIONS

Texas "DSP hardware extensions speed up 3G wireless multimedia", Retrieved from Google Cache: http://64.233.169.104/search?q=cache:FTgpbyDF2eAJ:www.eetimes.com/story/OEG20020906S0086.*

Hitachi Ltd "High-Performance Processor for 3G Mobile Phones with Videophones Capability", Oct. 2002.*

* cited by examiner

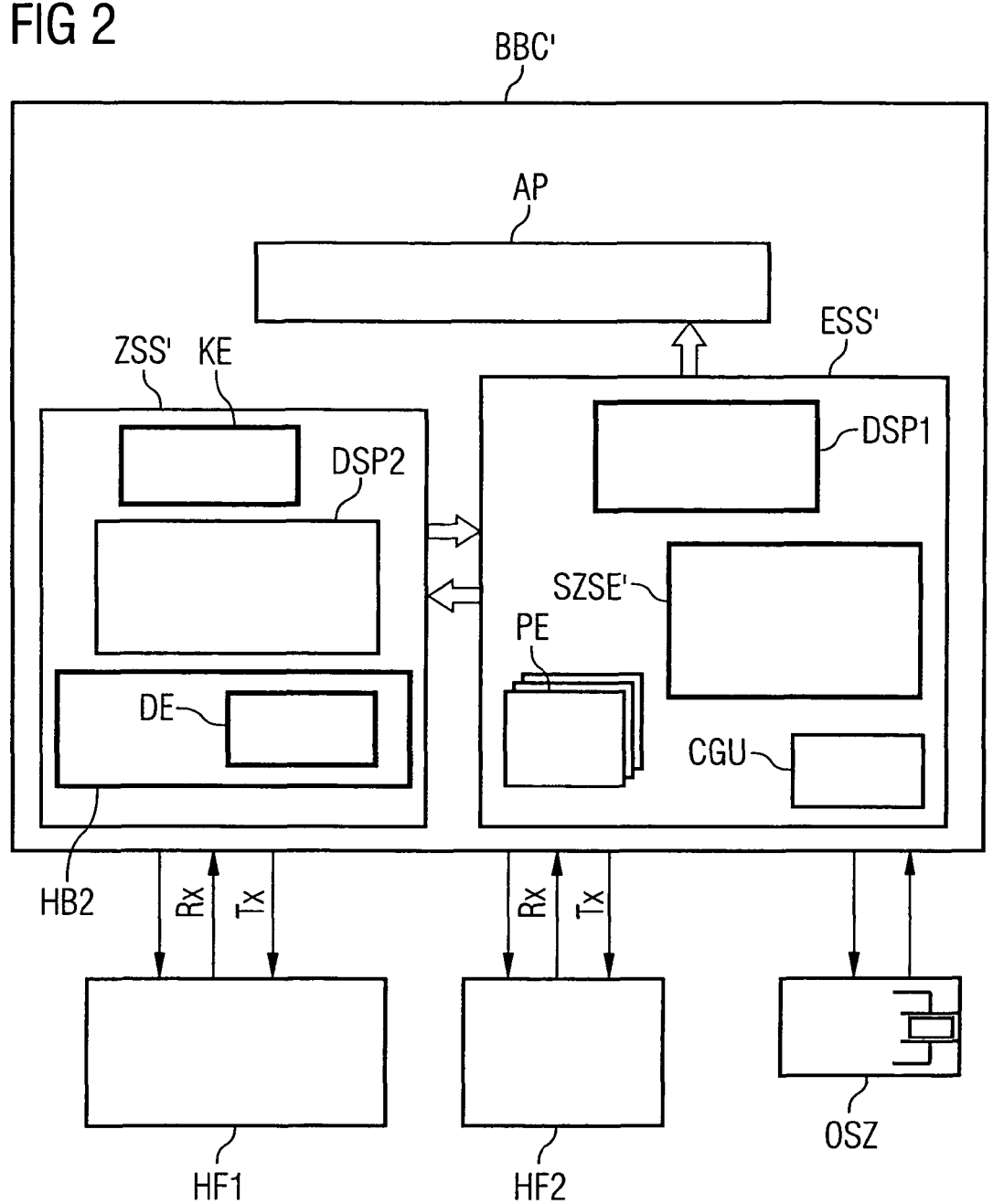

MOBILE STATION AND METHOD FOR PROCESSING SIGNALS OF THE GSM AND TD-SCDMA RADIO STANDARDS

REFERENCE TO RELATED APPLICATIONS

This application claims the benefit of the priority date of German application DE 103 55 643.5, filed on Nov. 28, 2003, the contents of which are herein incorporated by reference in their entirety.

FIELD OF THE INVENTION

The invention relates to a mobile station that is designed for processing two different radio standards and to a method for processing signals of different radio standards.

BACKGROUND OF THE INVENTION

In modern mobile radio technology it is often necessary for mobile stations to support two different mobile radio standards. For instance it is known that mobile stations are designed to support the radio standards GSM (Global System for Mobile Communication) and UMTS (Universal Mobile Telecommunications System). GSM is a second generation radio standard, referred to as a 2G standard. A further development of the GSM standard is implemented by the extension GPRS (General Packet Radio Services) and EDGE (Enhanced Data Rates for GSM Evolution), which are referred to as 2.5G standards. UMTS, on the other hand, is a third generation radio standard, and is referred to as a 3G standard. Another third generation mobile radio standard is the TD-SCDMA radio standard (Time Division Synchronous Code Division Multiple Access), which is designed in particular for the use of mobile radio in Asian countries. In addition to the GSM standard, it is therefore necessary for mobile stations to be designed to also support at least the TD-SCDMA standard as well.

To enable a smooth transition from so-called 2.5G systems to 3G systems, such mobile stations are designed as multi-mode systems. However, this requires an enormous development effort and can currently only be realized with a substantial outlay for hardware. Separate hardware elements are provided in the mobile station for every radio standard to be supported. As a consequence, there is a limit to how much smaller the mobile stations can be built, and in addition it is relatively costly. One direct approach to developing a mobile station that supports both the GSM and TD-SCDMA standards is the use of a coprocessor in which the communication standards are processed in separate hardware blocks. This approach is however extremely costly to implement, and is also very unsuitable for implementing the software required. Instead of using a coprocessor, another approach is based on an integrated solution in which the baseband signal processing for 2.5G systems and 3G systems is executed within one chip, with separate blocks also being required here for the different radio standards, which results in a relatively large chip area.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention is directed to a mobile station and a method with which signals of different radio standards can be processed inexpensively and effectively with a reduced hardware outlay.

A mobile station according to the invention is designed for processing signals of at least two different radio standards, wherein one radio standard is a 3G radio standard, for example, the TD-SCDMA radio standard, and a second radio standard is a 2G or a 2.5G radio standard, for example, the GSM/EDGE/GPRS radio standard. An aspect of the invention is that the mobile station has components, each of which is designed to process signals of both radio standards. As a result, the outlay for components in the mobile station can be reduced. In addition, the multiple use of the components enables an effective and reliable processing of the signals of all radio standards supported by the mobile station. By reducing the component outlay, it is also possible to make the dimensions of the mobile station smaller and reduce the manufacturing costs.

In an advantageous embodiment, the mobile station includes algorithms for controlling the protocols which can be used in each case for both radio standards. This enables multiple use in the area of control as well, and consequently a more effective and more efficient signal processing can be achieved, and can moreover be realized with less effort and at a lower cost.

It is advantageous if the algorithms can be used for controlling the 2G radio standard protocols and/or for the 2.5G radio standard protocols and for the TSM protocols of the TD-SCDMA radio standard.

It is particularly preferred if the components include a channel decoding unit. It can also be provided that the components include a coding unit. It can furthermore be provided that a system clock pulse generator unit and a rate matcher are each designed for processing signals of both radio standards, and consequently can be used as hardware components for both radio standards in each case.

It can be provided that at least some of the components are arranged on a baseband chip. This enables integrated manufacturing and arrangement of the components on the chip and the signal paths can be minimized. Moreover, a particularly compact design of the required components can consequently be achieved.

It can be provided that radio standard-specific algorithms of both radio standards can be generated in the GSM baseband chip.

In a further advantageous embodiment, the mobile station includes a coprocessor that is electrically connected to the baseband chip. The coprocessor is preferably designed for implementing radio standard-specific algorithms of one of the two radio standards, for example, the UTRA-TDD (UMTS Terrestrial Radio Access Time Division Duplex) low chip rate standard of the TD-SCDMA radio standard. It can consequently be ensured that the mobile station can process both TD-SCDMA radio standards, the TSM standard and the UTRA-TDD low chip rate standard, with a reduced number of required components.

In the method according to the invention, signals of at least two different radio standards are processed in a mobile station, wherein one radio standard is a 3G radio standard, for example, the TD-SCDMA radio standard, and a second radio standard is a 2G or a 2.5G radio standard, for example, the GSM/EDGE/GPRS radio standard. An aspect of the invention is that the mobile station includes components in which signals of both radio standards are processed in each of said components. The signal processing of two radio standards in the mobile station can consequently be performed in a simple way with less outlay. By virtue of the minimized outlay for components, a cost-effective realization can be achieved.

It is particularly advantageous if the components include a channel decoding unit and a coding unit, in which signals of both radio standards are processed in each case. It is consequently possible to decode the signals of both radio standards in a single unit and to code the signals of both radio standards in a single unit. The multiple use of the respective components enables the size of the mobile station to be reduced and its more cost-effective manufacture.

In an advantageous embodiment, a coprocessor is electrically connected to the baseband chip, wherein radio standard-specific algorithms of one of the two radio standards, for example, the TD-SCDMA radio standard, are generated by means of the coprocessor. It can be provided that the protocols of the UTRA-TDD low chip rate standard of the TD-SCDMA radio standard are processed by means of the coprocessor.

BRIEF DESCRIPTION OF THE DRAWINGS

The invention will now be explained in greater detail with reference to schematic drawings, in which:

FIG. 2 shows a block circuit diagram of a second exemplary embodiment of a part of a mobile station according to the invention.

DETAILED DESCRIPTION OF THE INVENTION

Figure 1:
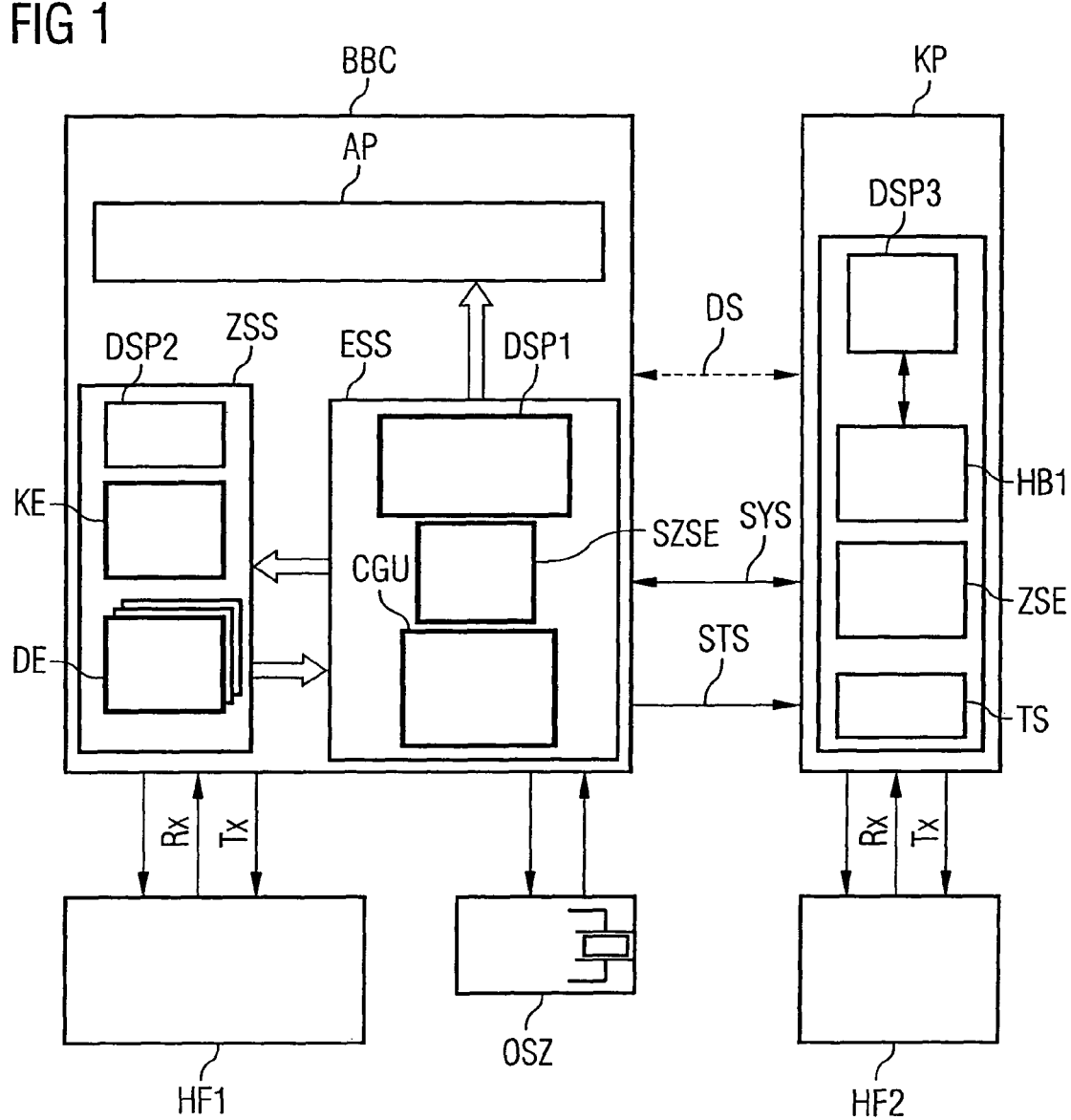
FIG. 1 shows a block circuit diagram of a first exemplary embodiment of a part of a mobile station according to the invention.

If one compares radio standards for GSM systems and TD-SCDMA systems, although the information is transmitted in fundamentally different ways it is possible to discern concordances and similarities at several points. Such overlaps and similarities exist in particular with respect to the clock pulse signal generation, the channel decoding, the rate matcher and with respect to the coding or encryption unit. An aspect of the invention is to use hardware and software for processing signals of both radio standards as much as possible. In particular, channel decoding can be performed by a shared hardware component according to the present invention. Said component for channel decoding can be switched over from one communication standard to the other by the setting of respective parameters. In addition, a physical coding unit or encryption unit is used both for coding the GSM/GPRS/EDGE signals and for coding the TD-SCDMA signals according to the present invention.

FIG. 1 shows a schematic block circuit diagram with the parts of a mobile station of importance to the invention, in which an embodiment with a coprocessor according to the invention is shown. A baseband chip BBC for processing signals of the GSM/GPRS/EDGE radio standard includes an application processor AP. The application processor AP is electrically connected to a first subsystem ESS of the baseband chip BBC. Arranged in the first subsystem ESS is a system clock pulse generator unit CGU, a system time control unit SZSE and a digital signal processor DSP1 for controlling the protocol software. The digital signal processor DSP1 can also be designed as a microprocessor.

The first subsystem ESS is electrically connected to a 2.5G modem subsystem ZSS for bidirectional signal exchange. The 2.5G modem subsystem ZSS includes a digital signal processor DSP2. Also arranged in the 2.5G modem subsystem is a coding unit KE and a channel decoding unit DE. The GSM/GPRS/EDGE baseband chip BBC is electrically connected to an oscillator OSZ for exchanging control and clock signals. The GSM/GPRS/EDGE baseband chip BBC is furthermore electrically connected to a GSM/EDGE high-frequency chip HF1 for exchanging control signals as well as send and receive signals of the GSM/GPRS/EDGE radio standard.

The exemplary embodiment in FIG. 1 further shows a coprocessor KP which is electrically connected to the GSM/GPRS/EDGE baseband chip BBC for the bidirectional exchange of data signals DS as well as synchronization signals SYS, and for the unidirectional exchange of control signals STS.

The coprocessor KP is designed for processing signals of the TD-SCDMA radio standard and includes a subsystem in which a digital signal processor DSP3 and a unit with TD-SCDMA hardware accelerators HB1 are arranged. The subsystem of the TD-SCDMA coprocessor KP furthermore includes a TD-SCDMA time control unit ZSE and a clock pulse signal processing unit TS. The TD-SCDMA coprocessor KP is electrically connected to a TD-SCDMA high-frequency chip HF2 for exchanging control signals as well as for exchanging send and receive signals of the TD-SCDMA radio standard.

In this exemplary embodiment of a coprocessor approach, the TD-SCDMA coprocessor KP is connected to the GSM/GPRS/EDGE baseband chip BBC. The TD-SCDMA coprocessor KP executes the TD-SCDMA-specific algorithms. According to the invention, the channel decoding unit DE and the coding unit KE are used for processing signals of both the TD-SCDMA and the GSM/GPRS/EDGE radio standard. For this purpose said units KE and DE are not arranged in the TD-SCDMA coprocessor KP, but rather in the baseband chip BBC. Furthermore, in the exemplary embodiment illustrated, the units DSP1, SZSE and CGU arranged in the GSM/GPRS/EDGE baseband chip BBC are also used for processing the signals of both radio standards. A substantial reduction in the hardware outlay can be achieved by virtue of the realization in accordance with FIG. 1, in particular by the dual use of the channel decoding unit DE for processing signals of the TD-SCDMA radio standard and of the GSM/GPRS/EDGE radio standard.

A further exemplary embodiment of the invention is shown in FIG. 2. An integrated approach is illustrated in the schematic block diagram of part of a mobile station. In this case the baseband chip BBC' is designed as a GSM/GPRS/EDGE+TD-SCDMA baseband chip and is consequently intended as a combined chip designed for both radio standards. The GSM/GPRS/EDGE+TD-SCDMA baseband chip BBC' includes a first subsystem ESS' in which, analogous to the exemplary embodiment in FIG. 1, a digital signal processor DSP1 is arranged. Furthermore, a system time control unit SZSE' which is designed for the system time control of both radio standards, TD-SCDMA and GSM/GPRS/EDGE, is arranged in the first subsystem ESS'. The first subsystem ESS' furthermore includes a system clock pulse generator unit CGU and peripheral units PE. The first subsystem ESS' is electrically connected to a second subsystem ZSS' of the GSM/GPRS/EDGE+TD-SCDMA baseband chip BBC' for bidirectional signal exchange. The second subsystem ZSS' includes a digital signal processor DSP2 as well as the coding unit KE. Also arranged in the second subsystem ZSS' is a unit with TD-SCDMA and GSM hardware accelerators HB2, wherein said unit HB2 includes the channel decoding unit DE in the exemplary embodiment.

The GSM/GPRS/EDGE+TD-SCDMA baseband chip BBC' is electrically connected to the GSM/EDGE high-frequency chip HF1, to the TD-SCDMA high-frequency chip HF2 and to the oscillator OSZ. In the second exemplary embodiment according to the invention as well, a substantial reduction in the hardware component outlay is achieved in particular by the dual use of the channel decoding unit DE for processing the signals of both radio standards. In the integrated approach illustrated in FIG. 2, the units KE of the second subsystem ZSS' and the units DSP1 and SZSE' of the first subsystem ESS' are additionally used for both radio standards. This results in an additional reduction of the hardware outlay required.

In both exemplary embodiments it can also be provided that the channel decoding unit DE and the coding unit KE are designed as one unit. The assignment of the channel decoding unit DE and the coding unit KE to the subsystem ESS or ESS' respectively is by way of example. It is also possible for the units DE and KE to be arranged at a different position in the baseband chip BBC or BBC' respectively.

For reuse of the software for controlling the protocols (layers 2 and 3 in the layer model), in both exemplary embodiments according to FIG. 1 and FIG. 2, it is necessary to differentiate between two different TD-SCDMA standards that are currently defined. The protocol of the UTRA-TDD low chip rate standard, as one of the two TD-SCDMA standards, is similar to the UTRA-FDD (UTRA Frequency Division Duplex) standard as used in UMTS systems. There is no significant opportunity to reuse protocol software here. In this case the majority of the protocol software must be rewritten. The protocol software is executed in this case in the digital signal processor DSP1 both in the exemplary embodiment with the coprocessor according to FIG. 1 and in the integrated solution according to FIG. 2. The use of the UTRA-TDD low chip rate mobile radio system requires here the implementation of second protocol software parallel to the GSM protocol software, as well as a larger storage capacity in the digital signal processor DSP1. In this case both protocol programs must be stored in DSP1. Depending on the communication system (GSM/EDGE or UTRA-TDD low chip rate) currently being used, one of the two programs is then loaded and executed.

On the other hand, the second existing TD-SCDMA standard, the TSM standard, is a further development of the GSM standard and has a protocol structure relatively similar to the GSM standard. Here it is now possible for a large part of the overall GSM protocol software to be used for the TSM protocols as well. According to the invention, therefore, the TSM protocol is processed in the same processor as the GSM protocol. The reusability of the units for channel decoding and for encryption is possible both in the embodiment of a mobile station with a coprocessor according to FIG. 1 and in an integrated realization according to FIG. 2, and is implemented physically in the unit DSP1. According to the invention, therefore, hardware blocks already present in the GSM/GPRS/EDGE chip are also used for TD-SCDMA operation and are operated as it were with a dual function. In particular with respect to channel decoding, with the coprocessor approach it is possible to realize a mobile station with a lower hardware outlay than the state of the art, in which a complete TD-SCDMA coprocessor with a separate TD-SCDMA channel decoding unit is present. Analogously, a substantial reduction in components is possible by using the units for channel decoding and for encryption in dual function for both radio standards, and consequently a much smaller chip area is required.

Although the invention has been illustrated and described with respect to one or more implementations, alterations and/or modifications may be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A mobile station, comprising:
a baseband integrated circuit chip, comprising:
a first baseband subsystem comprising:
a first digital signal processor configured to control a protocol of the mobile station based on a reception or transmission of data according to a first radio standard or a second, different radio standard;
a system control unit configured to transmit and receive control signals based on a dictated one of the first radio standard and the second, different radio standard in response to an instruction from the first digital signal processor;
a second baseband subsystem, comprising:
a second digital signal processor;
a coding unit configured to encode data supplied thereto according to a first radio standard or a second, different radio standard in response to an instruction from the second digital signal processor; and
a decoding unit configured to decode data supplied thereto according to the first radio standard or the second radio standard in response to an instruction from the second digital signal processor;
wherein the second digital signal processor is configured to generate and provide instructions to the coding unit and decoding unit, respectively, to dictate a processing according to the first radio standard or the second radio standard based on an instruction from the system control unit;
a coprocessor integrated circuit chip operably associated with the baseband integrated circuit chip, configured to receive and transmit data in accordance with the second radio standard, wherein the coprocessor is configured to transmit data for encoding or decoding to the second baseband system in accordance with instructions from the system control unit.

2. The mobile station of claim 1, wherein the coprocessor comprises a third digital signal processor configured to receive instructions from the system control unit, and control a transmission of data received from a high frequency chip associated with the second radio standard to the second baseband subsystem for decoding thereof.

3. The mobile station of claim 1, wherein the coprocessor comprises a third digital signal processor configured to receive instructions from the system control unit, and control a receipt of encoded data for transmission thereof to a high frequency chip associated with the second radio standard, the encoded data coming from the second baseband subsystem after encoding thereat.

4. The mobile station of claim 1, wherein the first baseband subsystem is configured to interface with a high frequency chip associated with the first radio standard.

5. The mobile station of claim 4, wherein the first digital signal processor of the first baseband system is configured to receive instructions from the system control unit and control a transmission of data received from the high frequency chip associated with the first radio standard to the second baseband subsystem for decoding thereof.

6. The mobile station of claim 4, wherein the first digital signal processor of the first baseband system is configured to receive instructions from the system control unit and control a receipt of encoded data for transmission thereof to the high frequency chip associated with the first radio standard.

7. A mobile station having a baseband integrated circuit, the baseband integrated circuit comprising:
    a first baseband subsystem, comprising:
        a first digital signal processor configured to control a protocol of the mobile station based on a reception or transmission of data according to a first radio standard or a second, different radio standard;
        a system control unit configured to transmit and receive control signals based on a dictated one of the first radio standard and the second, different radio standard in response to an instruction from the first digital signal processor;
    a second baseband subsystem, comprising:
        a second digital signal processor;
        a coding unit configured to encode data supplied thereto according to a first radio standard or a second, different radio standard in response to an instruction from the second digital signal processor; and
        a decoding unit configured to decode data supplied thereto according to the first radio standard or the second radio standard in response to an instruction from the second digital signal processor;
    wherein the second digital signal processor is configured to generate and provide instructions to the coding unit and decoding unit, respectively, to dictate a processing according to the first radio standard or the second radio standard based on an instruction from the system control unit;
    wherein the first baseband system is configured to interface with a first high frequency chip with data according to the first radio standard, and with a second high frequency chip with data according to the second radio standard.

8. The mobile station of claim 7, wherein the first digital signal processor of the first baseband system is configured to receive instructions from the system control unit and control a transmission of data received from the high frequency chip associated with the first radio standard to the second baseband subsystem for decoding thereof.

9. The mobile station of claim 7, wherein the first digital signal processor of the first baseband system is configured to receive instructions from the system control unit and control a transmission of data received from the high frequency chip associated with the second radio standard to the second baseband subsystem for decoding thereof.

10. The mobile station of claim 7, wherein the first digital signal processor of the first baseband system is configured to receive instructions from the system control unit and control a receipt of encoded data for transmission thereof to the high frequency chip associated with the first radio standard.

11. The mobile station of claim 7, wherein the first digital signal processor of the first baseband system is configured to receive instructions from the system control unit and control a receipt of encoded data for transmission thereof to the high frequency chip associated with the second radio standard.

12. A mobile station having a baseband integrated circuit, the baseband integrated circuit comprising:
    a first baseband subsystem, comprising:
        a first digital signal processor configured to control a protocol of the mobile station based on a reception or transmission of data according to a first radio standard or a second, different radio standard;
        a system control unit configured to transmit and receive control signals based on a dictated one of the first radio standard and the second, different radio standard in response to an instruction from the first digital signal processor;
    a second baseband subsystem, comprising:
        a second digital signal processor;
        a single coding/decoding unit configured to encode data supplied thereto according to a first radio standard or a second, different radio standard in response to an instruction from the second digital signal processor, and further configured to decode data supplied thereto according to the first radio standard or the second radio standard in response to an instruction from the second digital signal processor;
    wherein the second digital signal processor is configured to generate and provide instructions to the single coding/decoding unit, respectively, to dictate a processing according to the first radio standard or the second radio standard based on an instruction from the system control unit;
    wherein the first baseband subsystem is configured to interface with a first high frequency chip with data according to the first radio standard, and with a second high frequency chip with data according to the second radio standard.

* * * * *